United States Patent

[11] 3,620,992

[72] Inventors: Yung Ki Kim; Ogden R. Pierce, both of Midland, Mich.
[21] Appl. No.: 846,959
[22] Filed: Aug. 1, 1969
[45] Patented: Nov. 16, 1971
[73] Assignee: Dow Corning Corporation, Midland, Mich.

[54] MONOBROMO SUBSTITUTED FLUOROSILICONE POLYMERS
10 Claims, No Drawings

[52] U.S. Cl. .................................... 260/37 SB, 260/46.5 R
[51] Int. Cl. .................................... C08g 51/04, C08g 31/02
[50] Field of Search .......................... 260/37 LI, 46.5 R

[56] References Cited
UNITED STATES PATENTS

| | | | |
|---|---|---|---|
| 3,127,433 | 3/1964 | Tarrant | 260/46.5 X |
| 3,328,349 | 6/1967 | Lentz | 260/46.5 |
| 3,373,138 | 3/1968 | Brown | 260/46.5 |
| 3,423,445 | 1/1969 | Holbrook et al. | 260/46.5 X |

Primary Examiner—Morris Liebman
Assistant Examiner—L. T. Jacobs
Attorneys—Robert F. Fleming, Jr., Laurence R. Hobey, Harry D. Dingman and Norman E. Lewis ABSTRACT: Organosiloxanes, containing

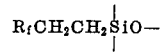

units, in which $R_f$ is a monobromoperfluoroalkyl radical, are disclosed as nonflammable fluid lubricants and as nonflammable elastomers which have high-temperature stability.

MONOBROMO SUBSTITUTED FLUORO-SILICONE POLYMERS

This invention relates to novel organosilicon compounds which contain both fluorine and bromide. In one aspect the invention relates to organopolysiloxanes which contain monobromoperfluoroalkylethyl substituents. In another aspect, the invention relates to nonflammable polymers.

Fluorosilicone polymers, such as trifluoropropylmethylpolysiloxanes, are known for their thermal stability and solvent resistant properties. For example fluorosilicone rubber retains its elastic properties over a wide temperature range and because of this characteristic has found application in a variety of environments. Fluorosilicone fluids also exhibit this high-temperature stability and are used as lubricants.

One problem remaining in the area of fluorosilicone technology is that the polymers burn readily when exposed to an open flame. This tendency to burn and lack of ability to self-extinguish when removed from the flame limits the use of such fluorosilicones in environments where there is a high hazard of fire. This problem is overcome by the practice of the invention which provides nonflammable fluorine-containing organosilicon polymers.

Thus, it is an object of the invention to provide novel organosilicon polymers.

It is another object of the invention to provide nonflammable fluorosilicone polymers which retain their temperature stability and solvent resistance.

According to the invention, there are provided organopolysiloxanes consisting essentially of units of the formula

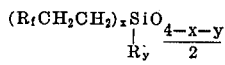

in which

R is a hydrogen atom, monovalent hydrocarbon radical, monovalent halohydrocarbon radical in which the halogen is chlorine, bromine or iodine, or a R'CH$_2$CH$_2$—radical in which R' is a perfluoroalkyl radical of from one to 20 inclusive carbon atoms;

R$_f$ is a monobromoperfluoroalkyl radical of from one to 20 inclusive carbon atoms;

$x$ is an integer having a value of from 1 to 3 inclusive; and $y$ is an integer having a value of from 0 to 2 inclusive, the sum of $x+y$ being no greater than 3.

Additionally, the invention provides copolymeric siloxanes comprising at least one unit of the formula

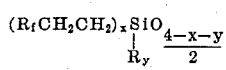

in which

R and R$_f$ are as defined above, $x$ is an integer having a value of from 1 to 3 inclusive and $y$ is an integer having a value of 0 to 2 inclusive; the sum of $x+$being no greater than 3;

the remaining units of the copolymer being of the formula

in which

Z is the hydrogen atom, the hydroxyl group, a hydrolyzable radical or an organic radical attached to the silicon atom by a silicon-carbon bond and $a$ is an integer having a value of from 0 to 3 inclusive.

R can be any monovalent hydrocarbon radical such as alkyl radicals, for example, methyl, ethyl, isopropyl, t-butyl, octadecyl, myricyl; cycloaliphatic radicals, for example, cyclohexyl, cyclopentyl and cyclohexenyl; aromatic hydrocarbon radicals, for example, phenyl, xenyl and naphthyl; aralkyl hydrocarbon radicals such as benzyl, beta-phenylethyl and beta-phenylpropyl; and alkenyl radicals, for example, vinyl, allyl, hexenyl, butadienyl or other unsaturated groups including CH≡C—. When R is an unsaturated group it is best to add it to the silicon subsequent to the formation of the ≡SiCH$_2$CH$_2$R$_f$— structure. This can be done, for example, by reacting an unsaturated Grignard reagent (i.e. vinyl magnesium bromide) with ≡SiCl. The same or different R groups can be attached to the same silicon atom.

R can also be any radical of the formula R'CH$_2$CH$_2$— in which R' is a perfluoroalkyl radical such as CF$_3$, C$_2$F$_5$, C$_8$F$_{17}$, C$_{10}$F$_{21}$, (CF$_3$)$_2$CF— or

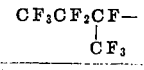

In addition, R can be any halohydrocarbon radical in which the halogen is Cl, Br or I, such as chloromethyl, gamma-chloropropyl, bromo-octadecyl, chlorocyclohexenyl, 3-chlorobutenyl-4, chlorophenyl, bromoxenyl, tetrachlorophenyl, p-chlorobenzyl, trichloropropyl and iodophenyl.

The R$_f$ radical itself can be a straight or branched-chain radical of from one to 20 carbons containing a single-bromine atom. Thus, included within the scope of the invention are homopolymers consisting essentially of units of the formula

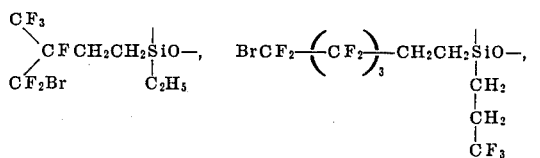

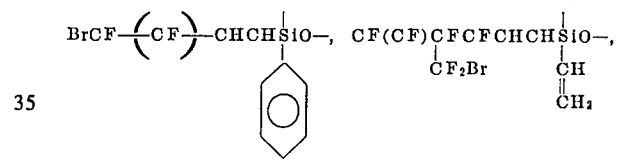

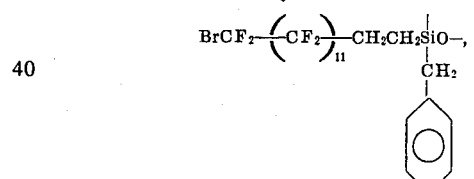

and

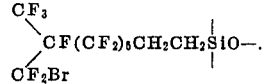

The copolymer contains units of the formula

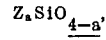

in which $a$ has a value of 0 to 3 inclusive.

Thus included in the copolymer are units of the type SiO$_2$, ZSiO$_{3/2}$, Z$_2$SiO and Z$_3$SiO$_{1/2}$. The same or different Z groups can be bonded to the same silicon atom.

Z can be the hydrogen atom, the hydroxyl group, a hydrolyzable radical or an organic radical attached to the silicon atom through a Si–C bond, such as any of the monovalent hydrocarbon or halohydrocarbon radicals described with respect to R, R'CH$_2$CH$_2$— radical as previously described, divalent hydrocarbon radicals, for example, methylene, dimethylene, octadecamethylene, and —CH$_2$CH=CHCH$_2$—; arylene radicals, for example, phenylene xenylene, tolylene, xylylene and napthylene; and cycloalkylene radicals, such as cyclohexylene and cyclopentylene. The divalent radicals include fluoroalkylene groups, such as —CH$_2$CH$_2$(CF$_2$)$_4$CH$_2$CH$_2$— and —CH$_2$CH$_2$(CF$_2$)$_{18}$CH$_2$CH$_2$—.

Also included with the scope of the invention are copolymeric siloxanes which contain olefin-substituted silicon atoms, such as

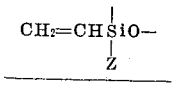

The methylvinylsiloxane units are especially preferred. These vinyl-containing units are usually present in amounts in the range of 0.1 to 10 mole percent to provide cross-linking sites in the copolymer.

As described above, Z can also be any hydrolyzable radical; i.e. one which is removed from the silicon atom by reaction with water at room temperature to form a silanol. Exemplary of such radicals are halogen atoms, such as chlorine and bromine; hydrocarbonoxy groups such as methoxy, ethoxy, octadecyloxy, allyloxy, cyclohexyloxy, phenoxy, tolyloxy, benzyloxy, —OCH$_2$CH$_2$OCH$_3$ and

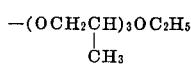

acyloxy groups such as acetoxy, propionyloxy, benzoyloxy, cyclohexyloxy, and

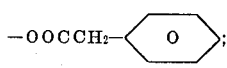

ketoxime groups such as

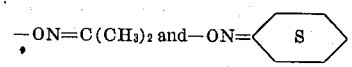

amine groups such

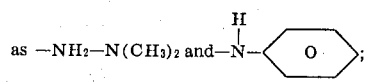

sulfide groups such as —SCH$_3$

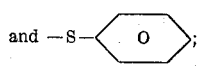

the nitrile group, the isocyanate group, sulfate groups such as

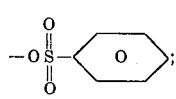

carbamate groups such as —OOCNHCH$_3$, —OOCN(CH$_3$)$_2$ and —OOCN(C$_2$H$_5$)$_2$ and groups such as —ON(CH$_3$)$_2$ and —ON(C$_3$H$_7$)$_2$.

The polymers of the invention are prepared by the hydrolysis or cohydrolysis of the corresponding silane by conventional means or by cohydrolysis of the silane with a silane of the formula Z$_a$SiX$_{4-a}$ in which Z and $a$ are as defined above and X is a hydrolyzable group. The particular method for hydrolysis can vary widely depending upon the nature of the substituent group on the silicon atom. Thus there are no critical conditions, other than the well known for hydrolyzing and cohydrolyzing silanes.

The silane monomer is best-prepared by reacting the bromine-containing olefin, R$_f$CH=CH$_2$ with a RX$_2$SiH in the presence of a platinum catalyst. Chloroplatinic acid is generally used as a catalyst in this ≡SiH vinyl addition reaction. The reaction proceeds as shown by the equation:

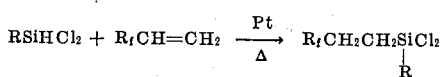

The monobromoperfluoroalkylolefin can be prepared by reacting a dibromoperfluoroalkane with ethylene to form the 1:1 adducts, which in turn are subjected to dehydrohalogenation to obtain the monobromo compounds.

A convenient method of preparing higher polymers is by hydrolysis of the silane to obtain a cyclic trimer, which in turn is polymerized by a ring-opening reaction, catalyzed by an acid catalyst, such as tetrafluoroethanesulfonic acid.

The polymers of the invention can be compounded with a filler to formulate a nonflammable elastomer which is solvent resistant, and retains its elastomeric properties over a wide range of temperature. Suitable fillers for such an elastomer include metal oxides, for example, titania, zinc oxide, ferric oxide and the like; siliceous materials, for example, clay, diatomaceous earth, crushed quartz and silicas, for example, fume silica, and silica aerogel. Carbon black is another suitable filler. If desired, the elastomers can also contain other materials such as compression set additives, pigments, oxidation inhibitors and other additives commonly used in organopolysiloxane rubbers.

The fillers can be employed in any desired amount ranging from five to 200 parts filler per 100 parts polymer. The amount of filler will vary with the type of filler and the properties desired in the finished elastomer. In sealant applications, it is preferred that the elastomer contain from 10 to 50 parts filler per 100 parts polymer.

The elastomers of the invention can be vulcanized by any of the known methods for vulcanizing organosiloxane rubber. One method comprises heating the compounded elastomer with an organic peroxide such as benzoyl peroxide, tertiary-butyl-perbenzoate, dicumyl peroxide, and tertiary-butyl-peracetate. Preferably, the peroxides are employed in amounts from 0.1 to 10 weight percent based on the amount of siloxane polymer in the formulation. Another method of vulcanization is to incorporate olefinic radicals in the polysiloxane which provide cross-linking sites for the vulcanization process. As shown in the examples, this can be done forming a copolymer in accordance with the invention where Z is a vinyl or other olefinic radical.

Another method comprises mixing the instant polysiloxanes containing alkenyl groups with SiH containing siloxanes and a platinum catalyst or by mixing the instant polymers containing SiOH groups with such room temperature active cross-linkers as alkoxy silanes, acetoxy silanes or SiH containing siloxanes with the appropriate metal catalysts, such as tin salt of carboxylic acids.

The fluid polymers of the invention are useful as lubricants and stable heat-transfer media. The fluid itself is a lubricant for steel on steel and can be formulated as a grease by the addition of a thickening agent. The unfilled fluid can be cross-linked to form a hard film which is useful as a protective coating on metals and ceramics.

The following examples are illustrative of the polymers of the invention and their utility; the examples are not intended to unduly limit the invention which is delineated in the claims.

EXAMPLE 1

A mixture of 657 grams (3.17 moles) of BrCF$_2$CF$_2$CH=CH$_2$; 402 grams of CH$_3$SiHCl$_2$ and 0.5 milliliters of a 0.1 molar solution of chloroplatinic acid in isopropanol were charged to a 2-liter pressure reactor which was equipped with a mechanical stirrer. The stirred mixture was maintained at 110° C. for 70 hours after which ≡ SiH addition to the olefin was deemed complete. The reaction product was distilled to obtain pure BrCF$_2$CF$_2$CH$_2$CH$_2$Si(CH$_3$$_2$, which had a boiling point of 89° C./35 mm. Hg. and $n_D^{25}$ of 1.4170.

EXAMPLE 2

Dichloromethylsilane was slowly added to a stirred mixture of 237 grams (0.583 mole) of Br(CF$_2$)$_6$CH=CH$_2$ and 3 milliliters of a 0.1 molar solution of chloroplatinic acid in isopropanol which was maintained at 110° C. A total of 84 grams (0.73 mole) of the silane was added. The progress of the ≡SiH addition reaction was monitored by gas chromatography. The reaction was complete after several hours at 110° C. The reaction mixture was distilled to obtain pure Br(CF$_2$)$_6$h$_2$CH$_2$Si(CH$_3$)Cl$_2$, which had a boiling point of 109° C./7 mm. Hg. The spectral properties were consistent with the assigned structure.
Analysis: Calculated for BrC$_9$H$_6$F$_{12}$Cl$_2$Si: C, 20.75; H, 1.16; F, 43.76; Cl, 13.61.
Found: C, 20.7; H, 1.35; F, 42.7; Cl, 13.62.

EXAMPLE 3

A portion (160 grams—0.31 mole) of the pure product of example 2 was slowly added to a stirred solution 60 grams (0.71 mole) of sodium bicarbonate in 500 milliliters of water. After the addition was complete, the mixture was heated to reflux temperature. The heating was continued for about 12 hours.

The organic layer of the reaction mixture was separated and dissolved in ether. The ethereal solution was washed with dilute hydrochloric acid and then with water until neutral, after which it was dried. The ether was removed by heating under vacuum to obtain a fluid polymer of the structure

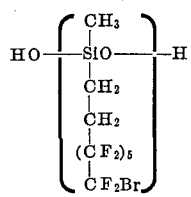

This fluid polymer was dissolved in cyclohexane and heated to reflux temperature for 1½ hours, after which, 67 grams (0.42 mole) of hexamethyldisilazane were added to the cyclohexane solution. After 17 hours at reflux temperature, the cyclohexane was removed under vacuum. The product was dissolved in ether, washed and dried to obtain a fluid polymer of the formula

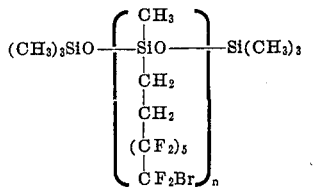

The fluid was subjected to 200° C./0.5 mm. Hg. for 12 hours to remove any cyclic or low-boiling fluids. After this treatment, the viscosity of the fluid was determined to be 340 cs. at 25°C.

A small amount of this polymer was placed in an open container and a flame was applied to the fluid surface. Whenever the flame was removed from the fluid, the polymer self-extinguished. This fluid is to be contrasted with 3,3,3-trifluoropropylmethylpolysiloxanes which burn readily to give a white ash when tested in this manner.

The lubrication properties of the fluid were determined by means of the LFW–4 Press Fit test and the Shell Four-ball test, which are described in detail in U.S. Pat. No. 3,386,917. Test results are as follows:

LFW–4 PRESS FIT

| | |
|---|---|
| % entry | 100% |
| coefficient of friction | 0.109 |
| maximum load | 6400 p.s.i. |

SHELL FOUR-BALL (at 1,200 r.p.m. for 1 hour at 167° F.—steel on steel)

| Load | Scar Dia | F. Ave. |
|---|---|---|
| 10 kg. | 0.43 (mm.) | 0.130 |

This data demonstrates that the fluid polymer is an excellent lubricant, which in view of its nonflammability, is suitable for use in environments where there is the hazard of fire.

EXAMPLE 4

A portion of the dichlorosilane of example 1 was added to a stirred mixture of 1.3 liters of ether and 1.5 liters of water at room temperature total addition of the silane amounted to about 1.6 kilograms. After addition, the reaction mixture was stirred for another 12 hours. The ether layer was separated and the aqueous phase was diluted and extracted with ether. The combined ether solution was washed with aqueous sodium bicarbonate and dried. The ether solvent was then removed under vacuum.

A first portion was distilled to obtain the cyclic trimer

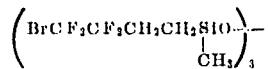

which had a boiling point of 111° C./0.2 mm. Hg. $n_D^{25}$ of 1.4110, and the cyclic tetramer,

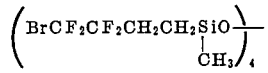

which had a boiling point of 181° C./0.2 mm. Hg. and $n_D^{25}$ of 1.4140. The still residue was mixed with about 7 grams of potassium hydroxide and the mixture was distilled under vacuum. The distillate boiling in the range up to 180° C./0.5 mm. Hg. was collected and redistilled in the absence of base to obtain an additional quantity of cyclic trimer.
Analysis: Calculated for

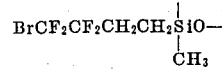

C, 22.48; H, 2.64; Br, 29.92;
Found: C, 22.6; H, 2.68; Br, 29.9.
Analysis: Calculated for

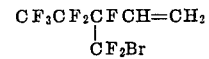

same as above.
Found: C, 22.6; H, 2.58; Br, 30.1.
The remaining portion of the hydrolyzate was mixed with about 14 grams of potassium hydroxide which was distilled and redistilled in the manner described above to yield the cyclic trimer.

EXAMPLE 5

is readily prepared by the addition of ethylene to CF$_3$CF$_2$(CF$_2$Br)CFBr followed by the dehydrobromination of the addition product. When the olefin is reacted with CH$_3$SiHCl$_2$ in the presence of chloroplatinic acid, CF$_3$CF$_2$(CF$_2$Br)CFCH$_2$CH$_2$Si(CH$_3$)Cl$_2$ is obtained.

The silane product is added to a sodium bicarbonate solution to give the hydrolyzate, which is condensed in the presence of tetramethylguanidinetrifluoroacetic acid to produce a hydroxyl-endblocked fluid polymer of

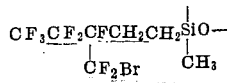

units. When this polymer is milled with vinyltriacetoxysilane (cross-linker) and dibutyltindiacetate (catalyst), the material will cure at room temperature to give an elastomer.

EXAMPLE 6

When 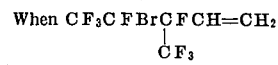

is reacted with $CH_3SiHCl_2$, followed by hydrolysis and condensation, there is produced a hydroxyl-endblocked fluid polymer of

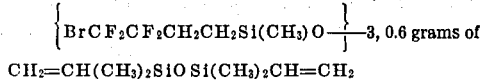

units.

EXAMPLE 7

A mixture of 121 grams of the cyclic trimer, $$\left\{ BrCF_2CF_2CH_2CH_2Si(CH_3)O \right\}_3, \text{ 0.6 grams of}$$

$$CH_2=CH(CH_3)_2SiO\,Si(CH_3)_2CH=CH_2$$

and 0.3 grams of tetrafluoroethanesulfonic acid (catalyst) was stirred at room temperature under a nitrogen atmosphere. After 3 hours, about 1 gram of dry sodium bicarbonate powder was added to the reaction mixture and the mixture was stirred for another 1.5 hours. The resulting reaction mixture was taken into ether and the ether solution was washed with water and dried. After removal of the ether under vacuum, the polymer product was stripped of volatiles by heating to 125° C. under high vacuum for 15 hours. After this treatment, the fluid polymer had a viscosity of about 4,600 cs. at 25° C. The polymer was of the formula

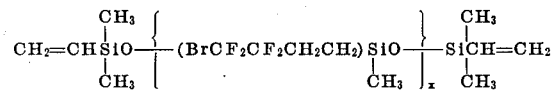

When submitted to the open flame test, the viscous fluid was self-extinguishing.

One-hundred parts by weight of the vinyldimethylsiloxy end-blocked polymer were compounded with 40 parts by weight of silica (filler), four parts by weight of

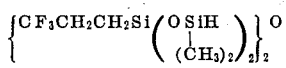

(cross-linker), two parts by weight carbon black (stabilizer) and 0.3 parts of a platinum catalyst. This formulation was cured at room temperature and subjected to postcure heat treatment of 70° C. for 1 hour, 100° C. for an additional hour and 150° C. for another hour.

The physical properties of the cured elastomer are given below:

| | |
|---|---|
| Shore "A" Durometer | 37 |
| Tensile Strength | 170 p.s.i. |
| Elongation | 80% |

After heating for 24 hours at 250° C., the formulated polymer retained its elastomeric characteristics.

EXAMPLE 8

A mixture of 20 grams of the cyclic trimer of example 4, 2 grams of $CH_3CN$, 20 milliliters of water and a catalytic amount of anhydrous ammonia was placed in a sealed glass container and shaken end-for-end for 5 days at room temperature. The resulting reaction mixture was stripped of volatiles by heating at 50° C. under high vacuum for about 12 hours and heating at 100° C. for an additional 2 hours. The resulting polymer was a viscous fluid of the formula

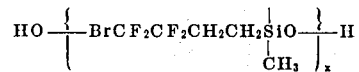

EXAMPLE 9

A mixture of 60 grams of

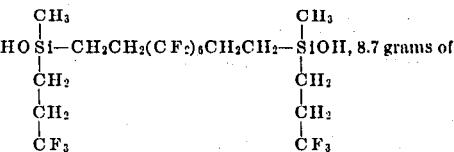

$BrCF_2CF_2CH_2CH_2Si(CH_3)Cl_2$ and 1.7 grams of $CF_3CH_2CH_2$ $Si(CH\ CH_2)Cl_2$ was stirred at 100° C. under a nitrogen atmosphere for about 15 hours. The reaction mixture was dissolved in ether and the etheral solution was washed with saturated sodium bicarbonate. After washing with water and drying, the ether was removed by vacuum distillation to yield the prepolymer, which was condensed in the presence of tetramethylguanidinetrifluoroacetic acid to give an elastomeric copolymer of the

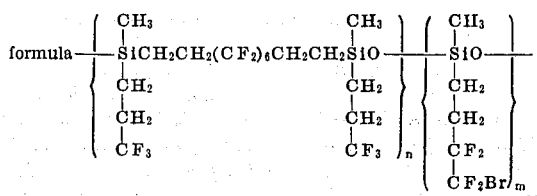

which contained 3,3,3,-trifluoropropylvinylsiloxy cross-linking sites.

That which is claimed is:

1. Organopolysiloxanes consisting essentially of units of the formula $$(R_fCH_2CH_2)_xSiO_{\frac{4-x-y}{2}}$$
$$R_y$$

in which
  R is a hydrogen atom, a monovalent hydrocarbon radical, a monovalent halohydrocarbon radical in which the halogen is chlorine, bromine or iodine, or a $R'CH_2CH_2-$ radical in which
  $R'$ is a perfluoroalkylene radical of from one to 20 inclusive carbon atoms;
  $R_f$ is a monobromoperfluoroalkyl radical of from one to 20 inclusive carbon atoms;
  $x$ is an integer having a value of from 1 to 3 inclusive; and
  $y$ is an integer having a value of from 0 to 2 inclusive, the sum of $x+y$ being no greater than 3.

2. A polymer in accordance with claim 1 consisting essentially of units of the formula

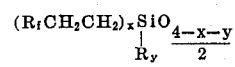

3. A polymer in accordance with claim 1 where $R_f$ is a $BrCF_2CF_2h_2CH_2-$ radical.

4. A polymer in accordance with claim 3 consisting of the cyclic trimer of

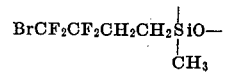

units.

5. A composition comprising the organopolysiloxane of claim 1 and a filler.

6. A composition in accordance with claim 5 wherein the filler is present in an amount in the range of 10 to 50 parts by weight per 100 parts by weight per polymer.

7. An organosiloxane copolymer consisting essentially of at least one unit of the formula

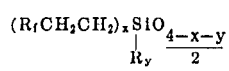

in which
R is a hydrogen atom, a monovalent hydrocarbon radical, a monovalent halohydrocarbon radical in which the halogen is chlorine, bromine or iodine, or a R'CH$_2$CH$_2$— radical in which
R' is a perfluoroalkyl radical of from one to 20 inclusive carbon atoms;
R$_f$ is a monobromoperfluoroalkyl radical of from one to 20 inclusive carbon atoms;
x is an integer having a value of from 1 to 3 inclusive; and
y is an integer having a value of from 0 to 2 inclusive, the sum of x+y being no greater than 3; the remaining units being of the formula

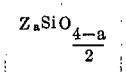

in which
Z is the hydrogen atom, the hydroxyl group, a hydrolyzable radical or an organic radical attached to the silicon atom by a carbon-silicon bond; and
a is an integer having a value of from 0 to 3 inclusive.

8. A copolymer in accordance with claim 7 wherein the remaining units comprise from 0.1 to 10 mole percent of methylvinylsiloxane units.

9. A copolymer in accordance with claim 7 consisting essentially of units of the formula

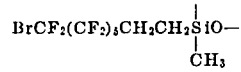

and units of the formula

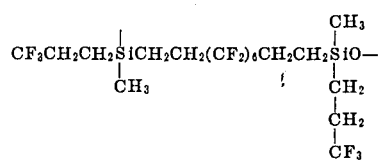

10. A copolymer in accordance with claim 7 consisting essentially of

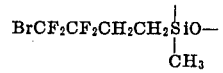

units endblocked with dimethylvinylsiloxy units.